(12) United States Patent
Aditjandra et al.

(10) Patent No.: US 12,622,548 B2
(45) Date of Patent: May 12, 2026

(54) HAND-HELD MIXER

(71) Applicant: Whirlpool Corporation, Benton Harbor, MI (US)

(72) Inventors: Antonius K. Aditjandra, St. Joseph, MI (US); Richard D. Arnold, St. Joseph, MI (US); Lynsey A. Howse, St. Joseph, MI (US); Rebecca K. Kasner, St. Joseph, MI (US); Joy Kathleen Kempic, Stevensville, MI (US); Brandon Tyler Mock, St. Joseph, MI (US); John Jay Myers, Saugatuck, MI (US); Nicholas Hill Schutte, St. Joseph, MI (US); Yifan Wang, Benton Harbor, MI (US); Rex D. Wilson, Stevensville, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 589 days.

(21) Appl. No.: 18/174,743

(22) Filed: Feb. 27, 2023

(65) Prior Publication Data

US 2023/0277003 A1     Sep. 7, 2023

Related U.S. Application Data

(60) Provisional application No. 63/376,174, filed on Sep. 19, 2022, provisional application No. 63/315,346, filed on Mar. 1, 2022.

(51) Int. Cl.
*A47J 43/08* (2006.01)
*A47J 43/044* (2006.01)

(52) U.S. Cl.
CPC ........... *A47J 43/082* (2013.01); *A47J 43/044* (2013.01); *A47J 2043/04418* (2013.01)

(58) Field of Classification Search
CPC .... A47J 2043/04427; A47J 2043/04418; A47J 43/082; B01F 35/32025
See application file for complete search history.

(56) References Cited

U.S. PATENT DOCUMENTS

| 2,552,972 A | 5/1951 | Jepson |
| D170,884 S | 11/1953 | Morgan |
| (Continued) | | |

FOREIGN PATENT DOCUMENTS

| CN | 211066274 U | * | 7/2020 |
| EP | 2488288 A1 | | 8/2012 |
| (Continued) | | | |

OTHER PUBLICATIONS

Espacenet translation of Jian-gan Guo (CN211066274U), published Jul. 24, 2020 (Year: 2020).*

(Continued)

*Primary Examiner* — Elizabeth Insler
(74) *Attorney, Agent, or Firm* — Price Heneveld LLP

(57) ABSTRACT

A hand-held mixer includes a housing, a pillar coupled to the housing at a pillar proximal end and extending to a pillar distal end, a motor within at least one of the housing and the pillar, a first beater hub removably receiving a first beater, and a battery receptacle at the pillar distal end. The battery receptacle receives a battery pack with a battery for powering the motor such that the battery pack is operable between a docked condition and an undocked condition. In the docked condition, the battery pack is engaged with the battery receptacle to provide power to the motor. In an undocked condition, the battery pack is disengaged from the battery receptacle. The battery pack moves along a battery pack axis that is substantially perpendicular to a first beater axis of rotation from the undocked condition to the docked condition.

20 Claims, 13 Drawing Sheets

(56) References Cited

U.S. PATENT DOCUMENTS

| | | | |
|---|---|---|---|
| D173,624 S | 12/1954 | Madl et al. | |
| D174,117 S | 3/1955 | Ernest | |
| D178,266 S | 7/1956 | Swann | |
| D178,543 S | 8/1956 | Seyfried et al. | |
| D182,885 S | 5/1958 | Ernest | |
| 3,187,366 A | 6/1965 | Fant | |
| D204,408 S | 4/1966 | Fischer | |
| 3,275,051 A | 9/1966 | Jepson et al. | |
| 3,280,351 A | 10/1966 | Wolter et al. | |
| 3,333,824 A | 8/1967 | Jepson et al. | |
| D208,805 S | 10/1967 | De Fano et al. | |
| D210,682 S | 4/1968 | De Fano et al. | |
| D219,671 S | 1/1971 | Levin | |
| 3,904,178 A | 9/1975 | Scott et al. | |
| D255,760 S | 7/1980 | Ernest et al. | |
| 4,277,181 A | 7/1981 | Stahly et al. | |
| 4,568,193 A | 2/1986 | Contri et al. | |
| D329,165 S | 9/1992 | Doggett | |
| D329,166 S | 9/1992 | Doggett | |
| D336,405 S | 6/1993 | Maass | |
| D337,667 S | 7/1993 | Lovett | |
| D362,783 S | 10/1995 | Cruz | |
| D367,400 S | 2/1996 | Viemeister et al. | |
| D384,549 S | 10/1997 | Cesaroni et al. | |
| D387,244 S | 12/1997 | Ivy et al. | |
| D392,505 S | 3/1998 | Tanaka et al. | |
| D395,572 S | 6/1998 | Carroll et al. | |
| 5,782,558 A | 7/1998 | Roberts | |
| D396,991 S | 8/1998 | Lallemand | |
| D400,049 S | 10/1998 | Wanat et al. | |
| D416,168 S | 11/1999 | Huang | |
| 5,979,850 A | 11/1999 | Hippen et al. | |
| D418,010 S | 12/1999 | Chan | |
| D419,365 S | 1/2000 | Endres | |
| D419,366 S | 1/2000 | Tse | |
| D433,593 S | 11/2000 | Mattijssen | |
| 6,234,663 B1 | 5/2001 | Lecerf et al. | |
| D465,698 S | 11/2002 | Allan | |
| D471,758 S | 3/2003 | Wilson | |
| D475,264 S | 6/2003 | Kondo et al. | |
| 6,572,254 B1 | 6/2003 | Marriere et al. | |
| 6,585,403 B2 | 7/2003 | Krall et al. | |
| D478,467 S | 8/2003 | Holderfield et al. | |
| 6,637,925 B1 | 10/2003 | Beaudet et al. | |
| 6,726,353 B1 | 4/2004 | Beaudet et al. | |
| D504,592 S | 5/2005 | Wanat | |
| D533,021 S | 12/2006 | Koszalinski et al. | |
| D539,603 S | 4/2007 | Holderfield et al. | |
| D540,114 S | 4/2007 | Picozza et al. | |
| D540,115 S | 4/2007 | Picozza et al. | |
| 7,314,308 B2 | 1/2008 | Fallowes et al. | |
| D587,962 S | 3/2009 | Picozza et al. | |
| D588,865 S | 3/2009 | Ferraby | |
| D593,360 S | 6/2009 | Lee | |
| 7,690,836 B2 | 4/2010 | Busick | |
| D628,012 S | 11/2010 | Bodum | |
| 8,162,530 B2 * | 4/2012 | Lee | A47J 43/082 366/601 |
| D665,223 S | 8/2012 | Haley et al. | |
| D665,224 S | 8/2012 | Benoit et al. | |
| D665,618 S | 8/2012 | Ho | |
| D703,480 S | 4/2014 | Lownds | |
| 9,138,103 B1 * | 9/2015 | Cados | B01F 27/2124 |
| D756,165 S | 5/2016 | Lee et al. | |
| D807,109 S | 1/2018 | Ho et al. | |
| D818,762 S | 5/2018 | Carlson | |
| D845,697 S | 4/2019 | Gordon et al. | |
| D859,912 S | 9/2019 | Powell | |
| 10,674,872 B2 | 6/2020 | Hoare et al. | |
| D892,539 S | 8/2020 | McConnell et al. | |
| D911,096 S | 2/2021 | McConnell et al. | |
| D911,767 S | 3/2021 | Koszylko | |
| D919,356 S | 5/2021 | DeLeo et al. | |
| D924,620 S | 7/2021 | DeLeo et al. | |
| D925,970 S | 7/2021 | McConnell et al. | |
| D930,426 S | 9/2021 | Bourgeois | |
| D938,222 S | 12/2021 | McConnell et al. | |
| D948,926 S | 4/2022 | McConnell et al. | |
| D953,097 S | 5/2022 | Zhang | |
| D971,669 S | 12/2022 | McConnell et al. | |
| 2005/0007867 A1 | 1/2005 | Wanat | |
| 2017/0055775 A1 | 3/2017 | Hoare et al. | |
| 2018/0272298 A1 * | 9/2018 | Carlson | B01F 33/50115 |
| 2021/0345830 A1 | 11/2021 | Hamarneh | |

FOREIGN PATENT DOCUMENTS

| | | | | | |
|---|---|---|---|---|---|
| FR | 2179539 A1 | | 11/1973 | | |
| GB | 850891 A | * | 10/1960 | | A47J 43/044 |
| WO | 2015022169 A1 | | 2/2015 | | |

OTHER PUBLICATIONS

DD Woodworking Workshop, "Makita Cordless Screwdriver Repair," published Sep. 11, 2018, https://www.youtube.com/watch?v=xUTXPb5XdVk&list=PLJPlr8okK31OXk7xe3pjngNNBqdlaoo0K, retrieved Jul. 20, 2023.

Elechomes Hand Mixer Electric. Date First Available on Amazon.com Jul. 13, 2020. https://www.amazon.com/dp/B089GL8HZ2/ref (Year: 2020).

BEAR Hand Mixer Electric. Date First Available on Amazon.com May 14, 2020. https://www.amazon.com/dp/B088LP3FBL/ref (Year: 2020).

Elegear Lightweight Electric Hand Mixer. Date First Available on Amazon.com Dec. 23, 2020. https://www.amazon.com/dp.B08R6YKLRG/ref (Year: 2020).

Mibanasu Electric Hand Mixer. First Available on Amazon.com Aug. 17, 2021. https://www.amazon.com/dp/B09CT9KRDV/ref (Year: 2021).

* cited by examiner

HAND-HELD MIXER

CROSS-REFERENCE TO RELATED APPLICATIONS

This application claims the benefit of priority under 35 U.S.C. § 119 of U.S. Provisional Application No. 63/315,346, filed on Mar. 1, 2022, and U.S. Provisional Application No. 63/376,174, filed on Sep. 19, 2022, the entire contents of which are incorporated herein by reference.

BACKGROUND OF THE DISCLOSURE

The present disclosure generally relates to a hand-held mixer, and more specifically to a battery-powered hand-held mixer.

SUMMARY OF THE DISCLOSURE

According to an aspect of the present disclosure, a hand-held mixer includes a housing having a front side and a rear side opposite the front side. A pillar is coupled to the housing at a pillar proximal end and extends outward therefrom to a pillar distal end. A motor is positioned within at least one of the housing and the pillar. A first beater hub removably receives a first beater having a beater head and a shaft coupled to the beater head. The first beater hub is operably engaged with the motor such that, in an engaged condition of the first beater, operation of the motor drives rotation of the first beater about a first beater axis of rotation. A battery receptacle is disposed at the pillar distal end and configured to receive a battery pack that has a battery for powering the motor such that the battery pack is operable between a docked condition and an undocked condition. In the docked condition, the battery pack is engaged with the battery receptacle to provide power to the motor. In an undocked condition, the battery pack is disengaged from the battery receptacle. The battery pack moves along a battery pack axis that is substantially perpendicular to the first beater axis of rotation from the undocked condition to the docked condition.

According to another aspect of the disclosure, a hand-held mixer includes a housing having a front side and a rear side opposite the front side. A first pillar is coupled to the housing at a first pillar proximal end and extends outward therefrom to a first pillar distal end. A second pillar is coupled to the housing at a second pillar proximal end and extends outward therefrom to a second pillar distal end. A motor is positioned within at least one of the housing and the second pillar. A first beater has a beater head and a shaft coupled to the beater head. The first beater is operably engaged with the motor in a removably engaged condition of the first beater with the housing, such that operation of the motor is configured to drive rotation of the first beater about a first beater axis of rotation. A battery receptacle is disposed at the second pillar distal end. Further, a battery pack has a battery for powering the motor and is operable between a docked condition and an undocked condition. In the docked condition, the battery pack is engaged with the battery receptacle to provide power to the motor. In the undocked condition, the battery pack is disengaged from the battery receptacle. The battery pack moves along a battery pack axis that is substantially perpendicular to the first beater axis of rotation from the undocked condition to the docked condition.

According to yet another aspect of the present disclosure, a hand-held mixer includes a housing having a front side and a rear side opposite the front side. A first pillar is coupled to the housing at a first pillar proximal end and extends outward therefrom to a first pillar distal end, and a second pillar is coupled to the housing at a second pillar proximal end and extends outward therefrom to a second pillar distal end. The second pillar is nearer than the first pillar to the front side of the housing. A motor is positioned within at least one of the housing and the second pillar and is configured to drive rotation of a drive shaft about a drive shaft axis of rotation. A gearbox has a plurality of gears disposed within at least one of the housing and the second pillar and is operably coupled to the motor. A first beater has a beater head and a shaft coupled to the beater head. The first beater is operable between an engaged condition and a disengaged condition. In the engaged condition of the first beater, the shaft of the first beater is partially inserted into a first aperture defined by the front side of the housing and operably engaged with the motor via the gearbox, such that rotation of the drive shaft about the drive shaft axis of rotation causes the first beater to rotate about a first beater axis of rotation that is substantially perpendicular to the drive shaft axis of rotation. In the disengaged condition of the first beater, the shaft of the first beater is not operably engaged with the motor via the gearbox and is removable from the first aperture defined by the housing. A battery receptacle is coupled to the second pillar distal end. Further, a battery pack is configured for 12-volt operation to power the motor and is operable between a docked condition and an undocked condition. In the docked condition, the battery pack is engaged with the battery receptacle to provide power to the motor. In the undocked condition, the battery pack is disengaged from the battery receptacle. The battery pack moves along a battery pack axis that is substantially parallel to the drive shaft axis of rotation from the undocked condition to the docked condition.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Figure 10:
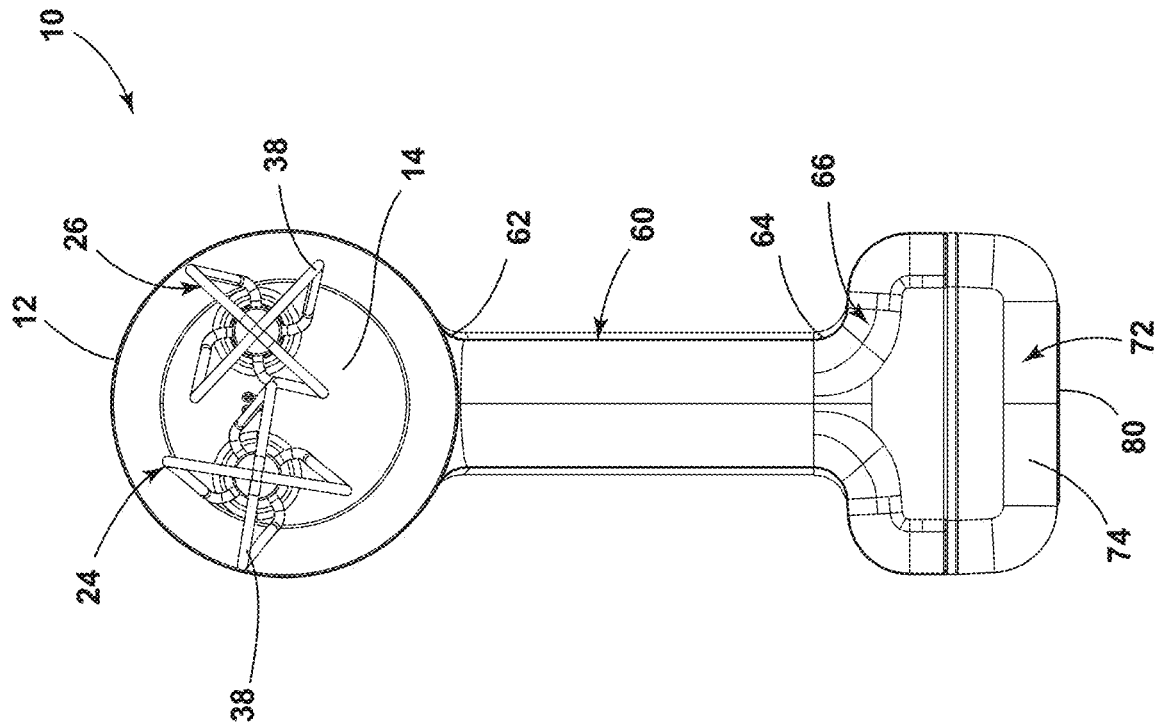
FIG. 10 is a front elevational view of a hand-held mixer.

For purposes of description herein, the terms "upper," "lower," "right," "left," "rear," "front," "vertical," "horizontal," and derivatives thereof shall relate to the disclosure as oriented in FIG. 10. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification, are psimply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
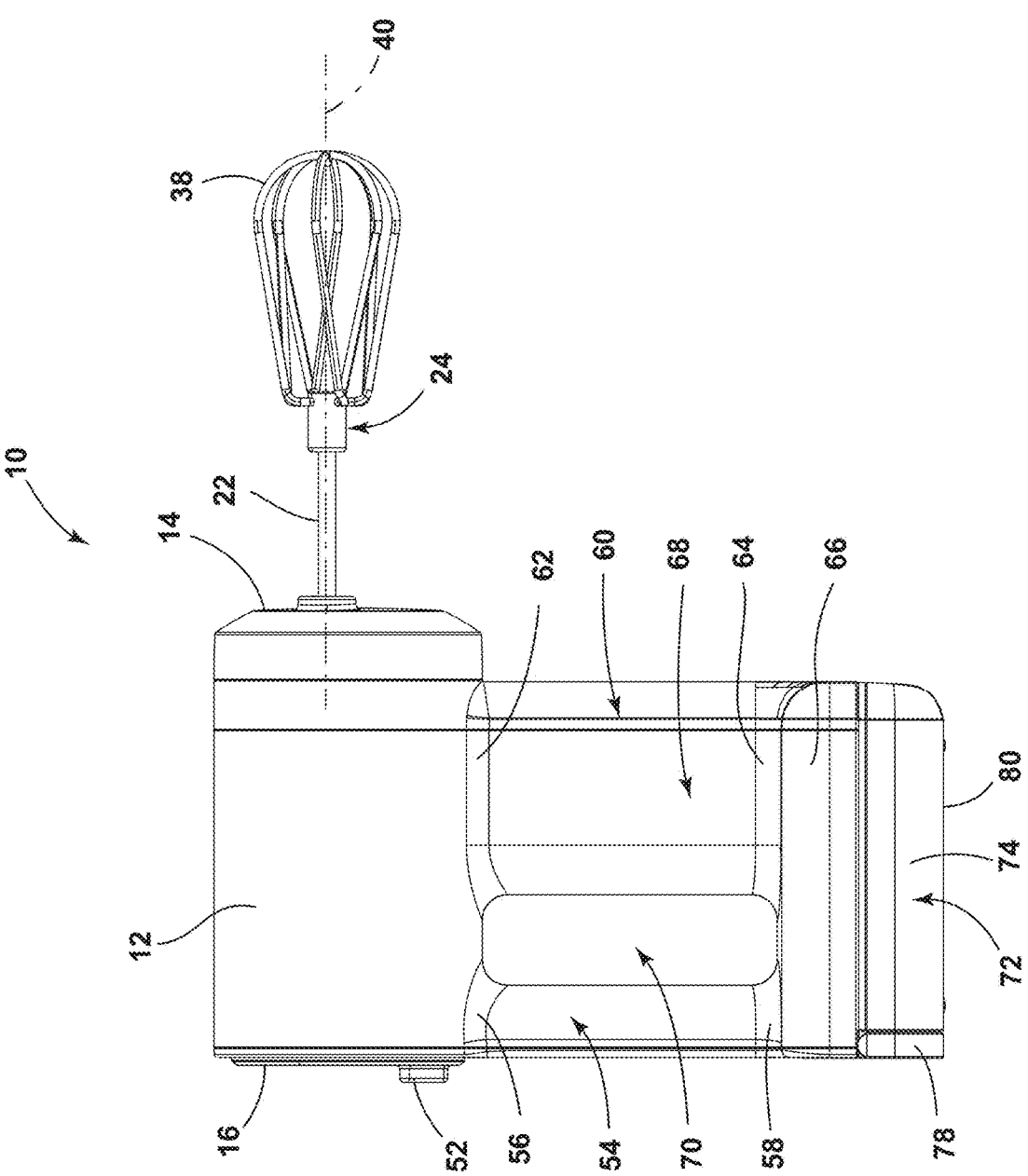
FIG. 2 is a side elevational view of a hand-held mixer that includes first and second beaters in engaged conditions and a battery pack in a docked condition.
Figure 3:
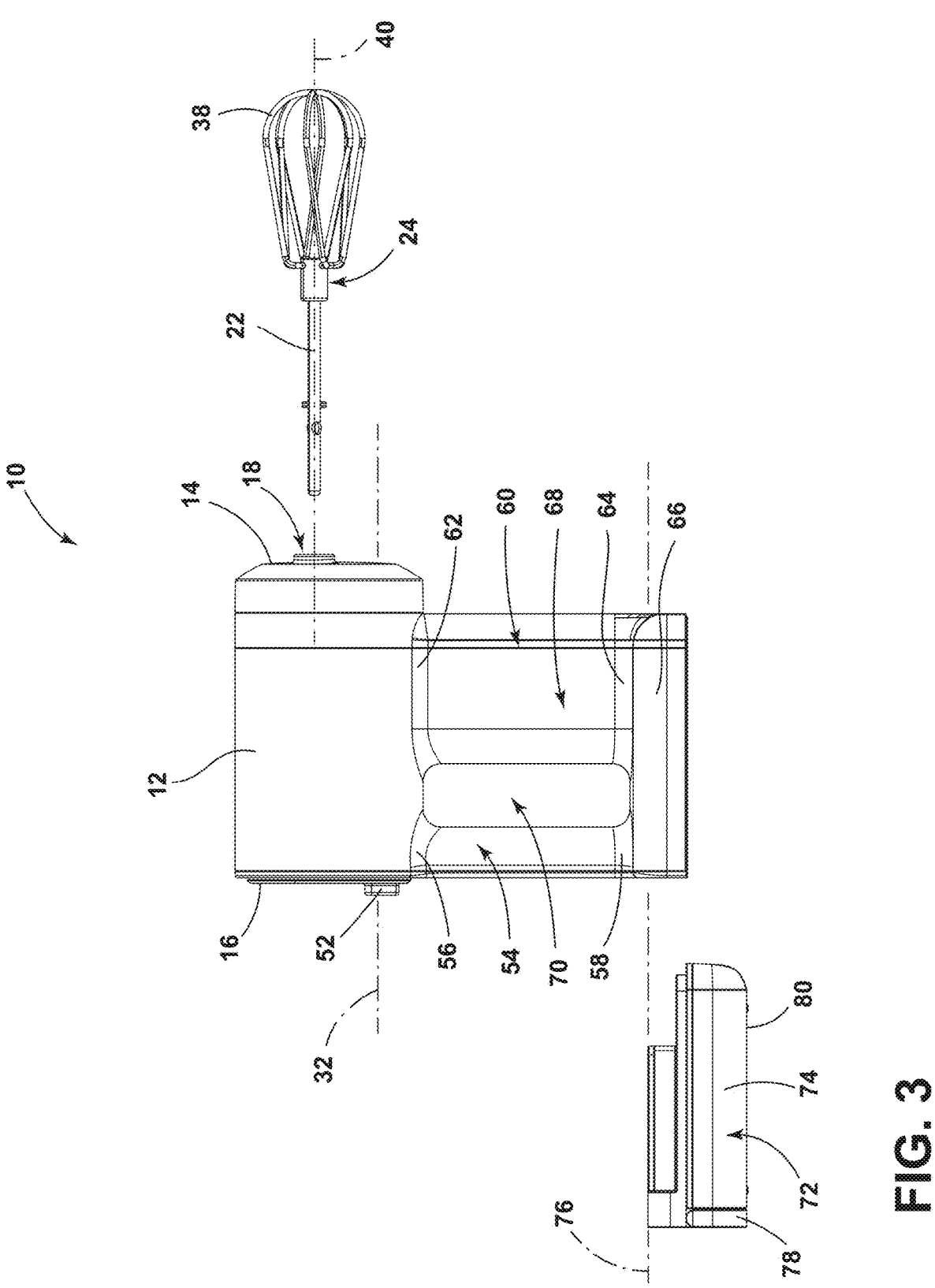
FIG. 3 is a side elevational view of a hand-held mixer that includes first and second beaters in disengaged conditions and a battery pack in an undocked condition.
Figure 4:
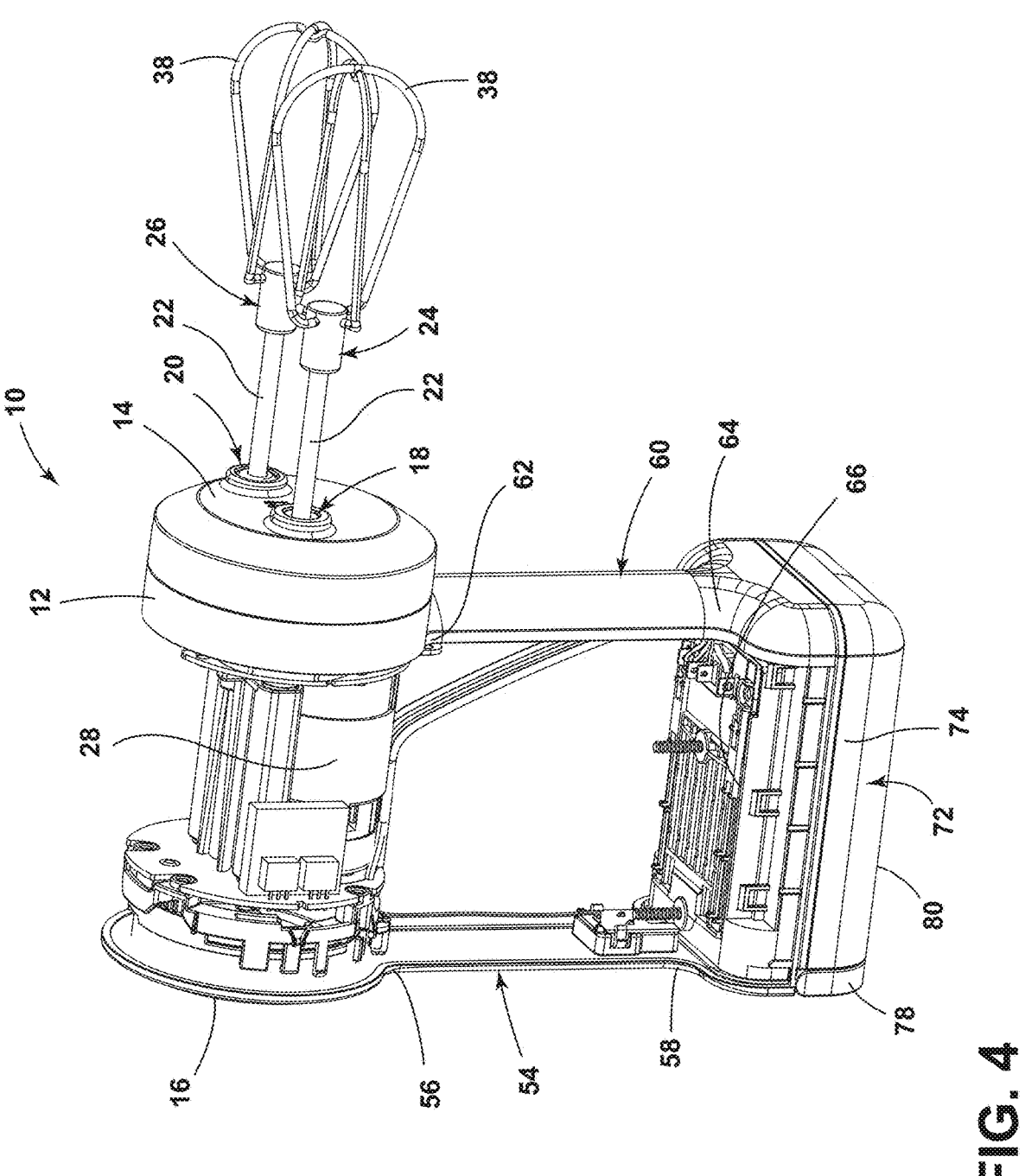
FIG. 4 is a perspective view of a hand-held mixer that illustrates internal components of the hand-held mixer.

Referring now to FIGS. 1-10, reference numeral 10 generally designates a hand-held mixer. The hand-held mixer 10 includes a housing 12. The housing 12 includes a front side 14 and a rear side 16 that is opposite the front side 14. As illustrated in FIG. 4, the front side 14 of the housing 12 defines a first aperture 18 and a second aperture 20. As described further herein, the first and second apertures 18, 20 are configured to receive shafts 22 of first and second beaters 24, 26 therein, respectively.

Figure 6:
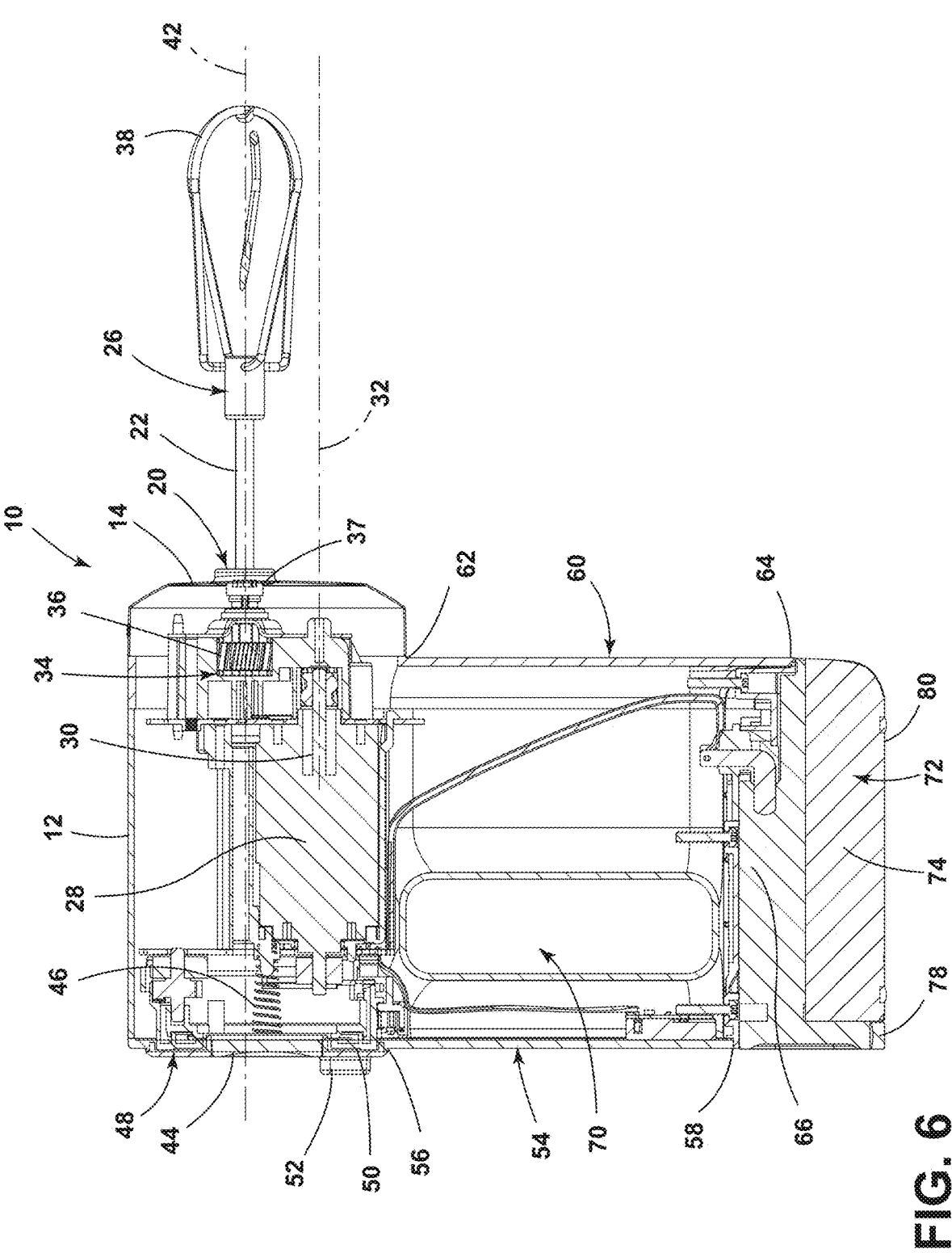
FIG. 6 is a cross-sectional view of the hand-held mixer of FIG. 5 taken at line VI-VI.
Figure 7:
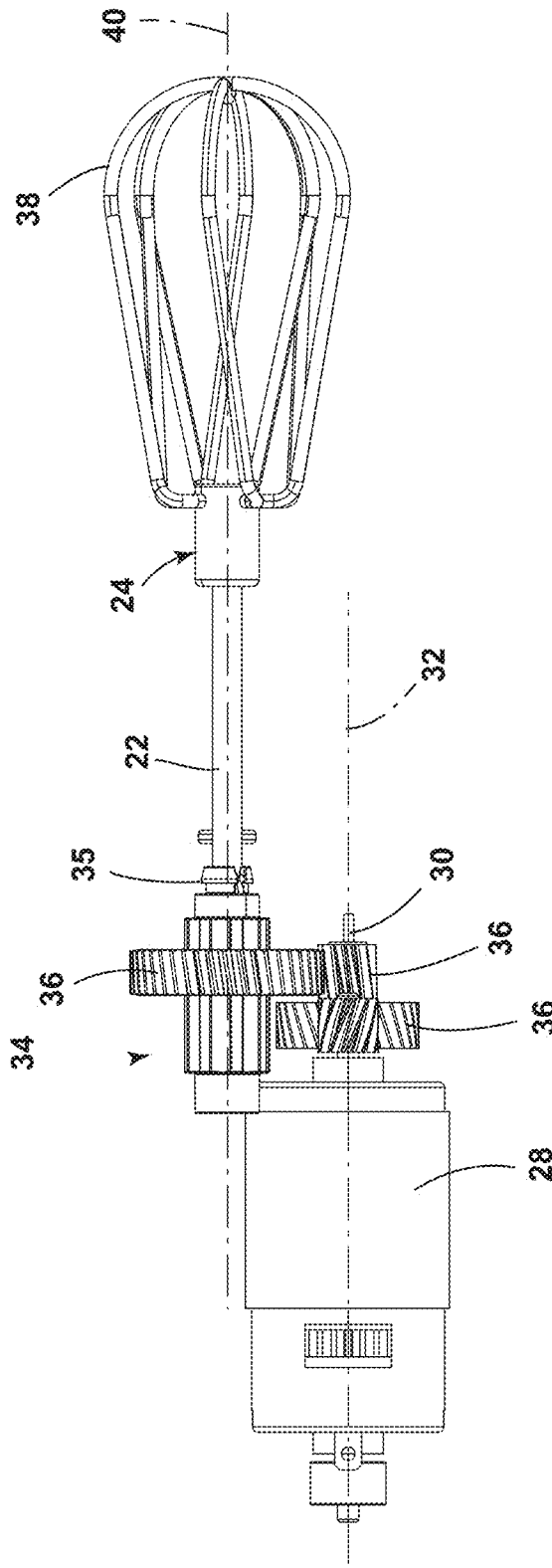
FIG. 7 is a side elevational view of a motor, a gearbox, and first and second beaters of a hand-held mixer.
Figure 8:
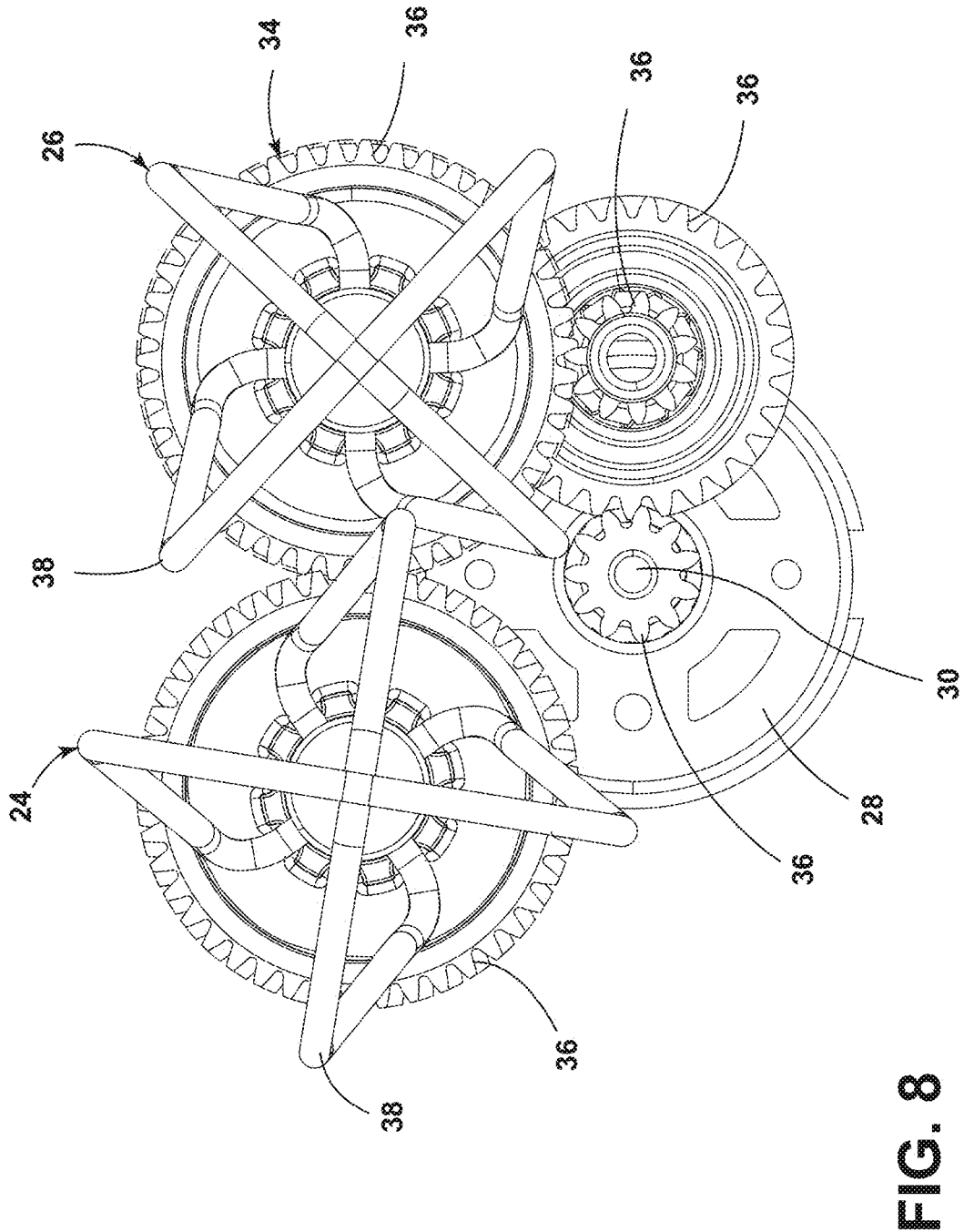
FIG. 8 is a front elevational view of a motor, a gearbox, and first and second beaters of a hand-held mixer.
Figure 9:
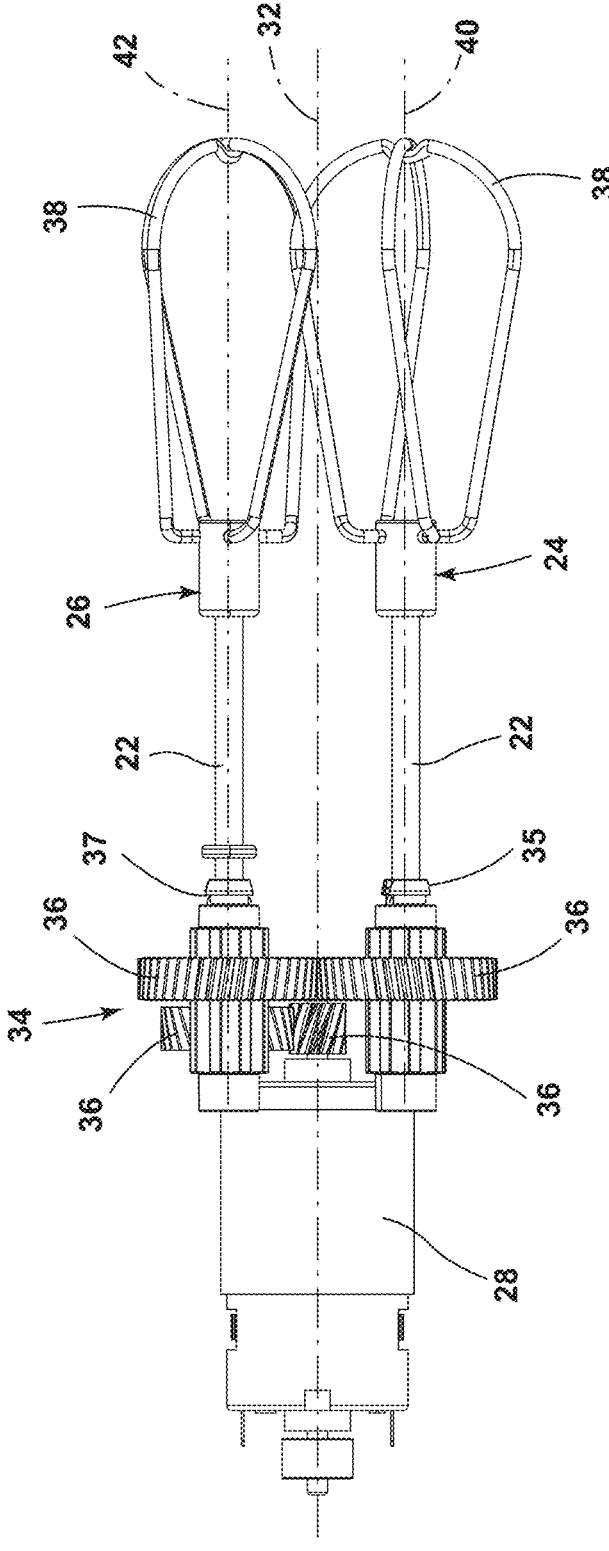
FIG. 9 is a plan view of a motor, a gearbox, and first and second beaters of a hand-held mixer.

The hand-held mixer 10 further includes a motor 28. As illustrated in FIGS. 4 and 6, the motor 28 is positioned within the housing 12 of the hand-held mixer 10. In various implementations, the motor 28 is configured to drive rotation of a drive shaft 30 of the motor 28 about a drive shaft axis of rotation 32, as illustrated in FIGS. 6 and 9. The drive shaft axis of rotation 32 may extend through the front and rear sides 14, 16 of the housing 12. A variety of types of motors 28 configured to drive rotation of the drive shaft 30 about the drive shaft axis of rotation 32 are contemplated.

Referring now to FIGS. 6-9, the hand-held mixer 10 includes a gearbox 34. As illustrated in FIG. 6, the gearbox 34 is disposed within the housing 12 of the hand-held mixer 10. In various implementations, the gearbox 34 is positioned between the front side 14 of the housing 12 and the motor 28 of the hand-held mixer 10. The gearbox 34 includes a plurality of gears 36. A variety of types of gears 36 are contemplated. In the embodiment illustrated in FIGS. 7-9, the gearbox 34 includes a plurality of helical gears 36. The plurality of gears 36 of the gearbox 34 are configured to interlock and are rotated by the drive shaft 30 which is rotated by the motor 28. As described further herein, the plurality of gears 36 are configured to convert rotational movement of the drive shaft 30 to rotational movement of the first and second beaters 24, 26.

Referring still to FIGS. 6-9, the hand-held mixer 10 can include a first beater hub 35 and a second beater hub 37. The first beater hub 35 and the second beater hub 37 are operably engaged with the motor 28. The first and second beater hubs 35, 37 can be operably engaged with the motor 28 via the gearbox 34. The first beater hub 35 and the second beater hub 37 can receive portions of first and second beaters 24, 26, respectively, therein during operation of the hand-held mixer 10. Further, the first and second beater hubs 35, 37 can removably receive portions of the first and second beaters 24, 26 therein, such as within apertures of the first and second beater hubs 35, 37, as described further herein.

Figure 1:
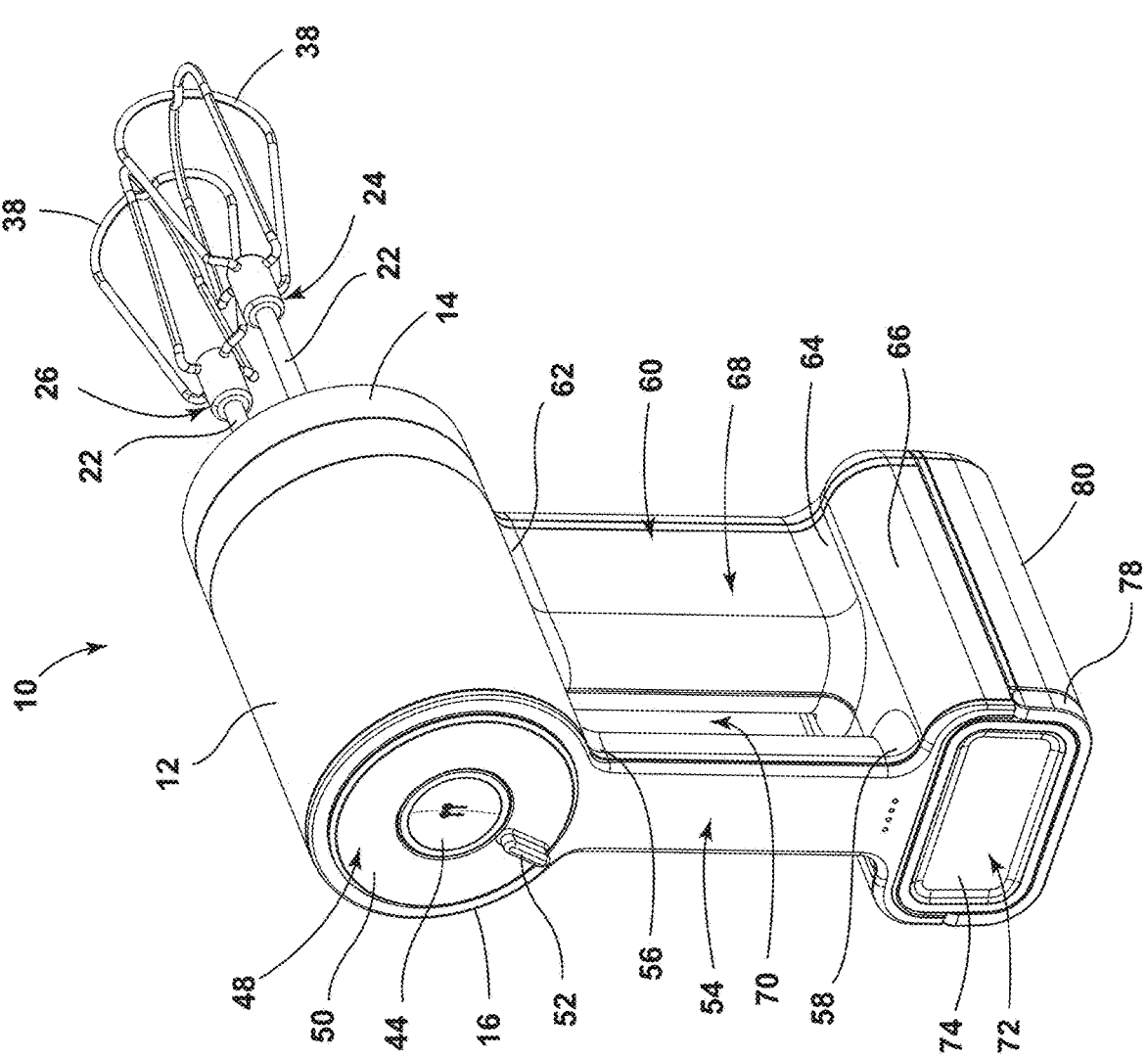
FIG. 1 is a top perspective view of a hand-held mixer.

Referring now to FIGS. 1-10, the hand-held mixer 10 includes a first beater 24 and a second beater 26. The first and second beaters 24, 26 each include a beater head 38 and a shaft 22 that is coupled to the beater head 38. As illustrated in FIGS. 2 and 3, the first beater 24 is operable between an engaged condition and a disengaged condition. In the engaged condition, the shaft 22 of the first beater 24 is partially inserted into the first aperture 18 that is defined by the front side 14 of the housing 12, as illustrated in FIGS. 2 and 4. Further, in the engaged condition, the shaft 22 of the first beater 24 is operably engaged with the motor 28 via the gearbox 34, such that rotation of the drive shaft 30 about the drive shaft axis of rotation 32 causes the first beater 24 to rotate about a first beater axis of rotation 40. As illustrated in FIG. 9, the first beater axis of rotation 40 is substantially parallel to the drive shaft axis of rotation 32. In the disengaged condition of the first beater 24, the shaft 22 is not operably engaged with the motor 28 via the gearbox 34. Further, the shaft 22 of the first beater 24 is removable from the first aperture 18 defined by the housing 12 in the disengaged condition, as illustrated in FIG. 3.

Referring still to FIGS. 1-10, the second beater 26 of the hand-held mixer 10 is operable between an engaged condition and a disengaged condition. In the engaged condition of the second beater 26, the shaft 22 of the second beater 26 is partially inserted into the second aperture 20 that is defined by the front side 14 of the housing 12, as illustrated in FIGS. 2 and 4. Further, the second beater 26 is operably engaged with the motor 28 of the hand-held mixer 10 via the gearbox 34 while the second beater 26 is in the engaged condition, such that rotation of the drive shaft 30 about the drive shaft axis of rotation 32 causes the second beater 26 to rotate about a second beater axis of rotation 42. As illustrated in FIG. 9, the second beater axis of rotation 42 is substantially parallel to the drive shaft axis of rotation 32 and the first beater axis of rotation 40. In the disengaged condition of the second beater 26, as illustrated in FIG. 3, the shaft 22 of the second beater 26 is not operably engaged with the motor 28 via the gearbox 34, and the shaft 22 is removable from the second aperture 20 defined by the housing 12. It is contemplated that the hand-held mixer 10 can include more or fewer beaters, in some implementations. For example, the hand-held mixer 10 can include four beaters in some embodiments.

Figure 5:
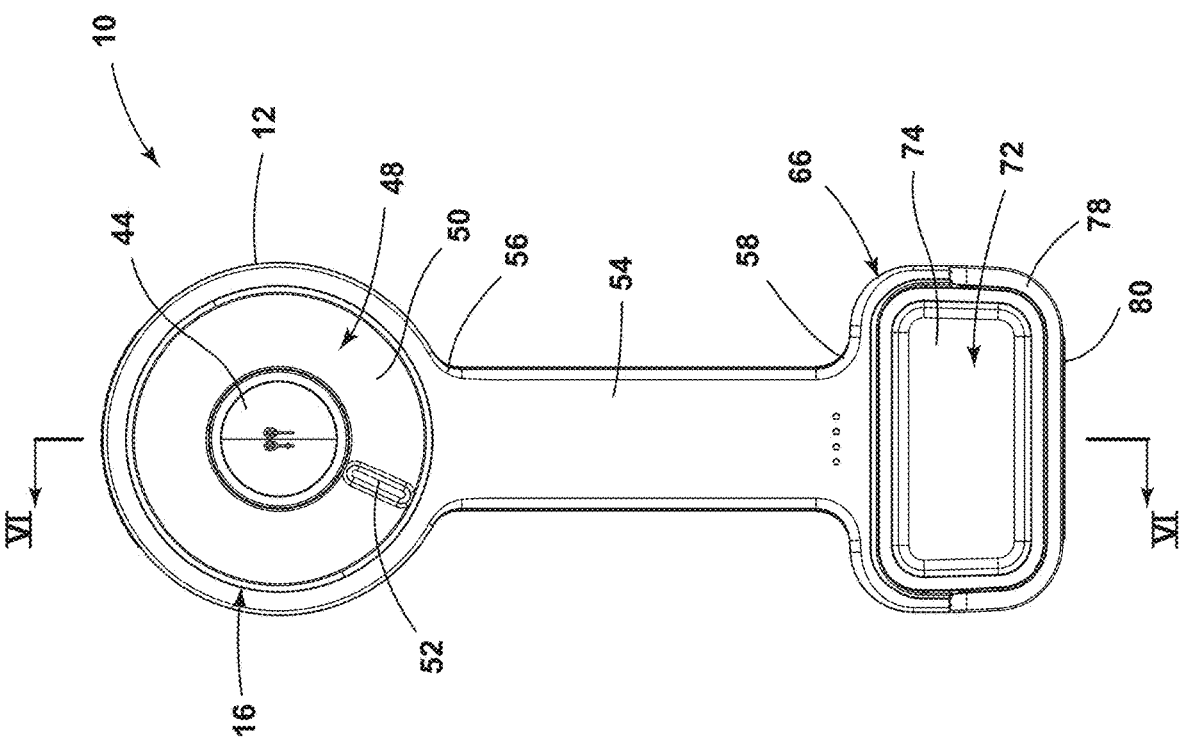
FIG. 5 is a back elevational view of a hand-held mixer that includes an ejector button and a rotary control ring that encircles the ejector button.

Referring now to FIGS. 1, 5, and 6, the hand-held mixer 10 can include an ejector button 44. As illustrated in FIGS. 1 and 5, the ejector button 44 can be positioned at the rear side 16 of the housing 12. The ejector button 44 is configured to be depressed to prompt the first and second beaters 24, 26 to enter the disengaged conditions, as illustrated in FIG. 3, from the engaged conditions, as illustrated in FIG. 2, respectively. In various embodiments, the ejector button 44 is configured to be depressed in a direction that is parallel to at least one of the first beater axis of rotation 40, the second beater axis of rotation 42, and the drive shaft axis of rotation 32. In the embodiment illustrated in FIGS. 1, 5, and 6, the ejector button 44 is configured to be depressed toward the front side 14 of the housing 12 to release the first and second beaters 24, 26 from their operable engagement with the motor 28. As illustrated in FIG. 6, a spring 46 is coupled to the ejector button 44, such that the ejector button 44 is spring-loaded. It is contemplated that the ejector button 44 may be continually biased toward the undepressed position, as illustrated in FIG. 1, by the spring 46.

Referring now to FIGS. 1 and 5, the hand-held mixer 10 can include a control feature 48 for controlling operation of the motor 28. In the embodiment illustrated in FIGS. 1 and 5, the control feature 48 is a rotary control ring 50. As illustrated, the rotary control ring 50 is disposed at the rear side 16 of the housing 12 and encircles the ejector button 44 of the hand-held mixer 10. In the illustrated embodiment, the rotary control ring 50 includes a tab 52 that extends outward from the rotary control ring 50 away from the front side 14 of the housing 12. The tab 52 may provide a handhold for a user adjusting the rotary control ring 50, and may indicate which setting the motor 28 is configured to be operated on based on the position of the tab 52.

The rotary control ring 50 is operable to move rotationally about the ejector button 44 to control operation of the motor 28. For example, in an exemplary embodiment, the rotary control ring 50 may be rotated clockwise from the perspective of FIG. 5 about the ejector button 44 to turn on the motor 28 and/or intensify operation of the motor 28. A variety of types of control features are contemplated. Further, it is contemplated that the rotary control ring 50 may partially encircle the ejector button 44, in some implementations. For example, the rotary control ring 50 may extend around a majority of a circumference of the ejector button 44, in some implementations. In some embodiments of the hand-held mixer 10, if the control feature 48 is switched to an "on" setting while the motor 28 is disconnected from a power source (e.g., a battery 74 is not connected to the hand-held mixer 10), subsequent connection of the motor 28 to the power source does not cause the motor 28 to turn on. Instead, once the power source is connected, switching the control feature 48 to an "off" setting and then switching the control feature 48 back to the "on" setting causes the motor 28 to turn on. As such, unexpected operation of the motor 28 when a power source is connected to the hand-held mixer 10 may be avoided.

Referring now to FIGS. 1-6 and 10, the hand-held mixer 10 includes a first pillar 54. The first pillar 54 is coupled to the housing 12 at a first pillar proximal end 56. The first pillar 54 extends outward from the first pillar proximal end 56 to a first pillar distal end 58 that is distal from the housing 12. The hand-held mixer 10 further includes a second pillar 60 that is coupled to the housing 12. The second pillar 60 is coupled to the housing 12 at a second pillar proximal end 62 and extends outward from the housing 12 to a second pillar distal end 64. As illustrated in FIGS. 1-3, the second pillar 60 is nearer than the first pillar 54 to the front side 14 of the housing 12. Further, as illustrated in FIGS. 2 and 3, the second pillar 60 may be larger than the first pillar 54.

Referring still to FIGS. 1-6 and 10, the hand-held mixer 10 includes a battery receptacle 66. The battery receptacle 66 is coupled to the first and second pillar distal ends 58, 64 of the first and second pillars 54, 60. As illustrated in FIGS. 2 and 3, the battery receptacle 66 extends between the first pillar distal end 58 and the second pillar distal end 64. In various embodiments, the battery receptacle 66, the first pillar 54, the housing 12, and the second pillar 60 form a loop 68 that defines a handle aperture 70. In operation of the hand-held mixer 10, a portion of a hand of a user may extend through the handle aperture 70 defined by the hand-held mixer 10, as the user grabs the first pillar 54 to operate the hand-held mixer 10.

Referring still to FIGS. 1-6 and 10, the battery receptacle 66 may be configured to receive a battery pack 72 for powering the motor 28 of the hand-held mixer 10. As illustrated in FIG. 6, wires and other electrical components may extend from the battery receptacle 66 to the motor 28 within the housing 12 through the interior of the first and/or second pillars 54, 60 of the hand-held mixer 10. As described further herein, the battery receptacle 66 may be configured to receive the battery pack 72 of the hand-held mixer 10. It is contemplated that at least a portion of the housing 12, the first and/or second pillars 54, 60, and/or the battery receptacle 66 may be integrally coupled to each other. For example, in some embodiments, the hand-held mixer 10 can include an outer shell that forms at least a portion of the housing 12, the first and second pillars 54, 60, and the battery receptacle 66.

Referring now to FIGS. 1-6 and 10, the hand-held mixer 10 includes the battery pack 72. The battery pack 72 includes a battery 74 that is configured to power the motor 28 of the hand-held mixer 10. As illustrated in FIGS. 2 and 3, the battery pack 72 is operable between a docked condition, as illustrated in FIG. 2, and an undocked condition, as illustrated in FIG. 3. In the docked condition of the battery pack 72, the battery pack 72 is engaged with the battery receptacle 66 to provide power to the motor 28 of the hand-held mixer 10. In the undocked condition, the battery pack 72 is disengaged from the battery receptacle 66, as illustrated in FIG. 3.

As further illustrated in FIG. 3, the battery pack 72 is operable to move from the undocked condition to the docked condition along a battery pack axis 76. In some implementations, the battery pack axis 76 may be substantially parallel to the drive shaft axis of rotation 32, the first beater axis of rotation 40, and/or the second beater axis of rotation 42. In other words, the battery pack 72 may move between the docked and undocked conditions in a direction that is substantially parallel to the drive shaft axis of rotation 32, the first beater axis of rotation 40, and/or the second beater axis of rotation 42, in some implementations. In the embodiment illustrated in FIGS. 2 and 3, the battery pack 72 moves from the undocked condition to the docked condition along the battery pack axis 76, which is substantially parallel to the drive shaft axis of rotation 32, first beater axis of rotation 40, and second beater axis of rotation 42, such that the battery pack 72 is nearer to the front side 14 of the housing 12 in the docked condition than in the undocked condition. In other words, the battery 74 moves toward the front of the hand-held mixer 10 as the battery 74 moves along the battery pack axis 76 from the undocked condition to the docked condition. In various implementations, the battery receptacle 66 may guide the direction of movement of the battery pack 72 along the battery pack axis 76.

Referring now to FIGS. 2 and 3, in some implementations, a battery pack handle 78 is coupled to the battery pack 72. In the embodiment illustrated in FIGS. 2 and 3, the battery pack handle 78 is pivotably coupled to a rear portion of the battery pack 72. The battery pack handle 78 is operable to pivot from a stowed position, as illustrated in FIG. 2, to a use position, as illustrated in FIG. 3. Pivoting the battery pack handle 78 from the stowed position to the use position may reduce the amount of force that restricts movement of the battery pack 72 from the docked condition to the undocked condition.

In various embodiments, the battery pack 72 is the furthest portion of the hand-held mixer 10 from the housing 12 in the docked condition of the battery pack 72. Further, the battery pack 72 includes a bottom surface 80 that is configured to rest upon a level surface, such as a counter, such that the hand-held mixer 10 sits upright (i.e., in an upright position) with the first beater axis of rotation 40 extending substantially horizontally, as illustrated in FIG. 2. The first and second beater axes of rotation 40, 42 may be substantially vertical in a use position of the hand-held mixer 10. For example, from the perspective of a viewer of FIG. 2, rotating the hand-held mixer 10 of FIG. 2 clockwise 90 degrees such that the first beater axis of rotation 40 extends substantially vertically would depict the hand-held mixer 10 in the use position.

As can be appreciated, the use of the battery 74 to power the motor 28 is such that the hand-held mixer 10 described herein is operable without having to plug the hand-held mixer 10 into an external power source (such as a wall outlet or the like) and results in the disclosed hand-held mixer 10 being characterized as "cordless". In this manner, the hand-held mixer 10 can be placed and operated in any convenient location along the counter space provided within the kitchen, regardless of the proximity of such location to a power outlet or another available power source. Additionally, as the battery pack 72 is operable to enter the undocked condition when the battery 74 of the battery pack 72 is depleted, the battery pack 72 can be undocked from the battery receptacle 66 and docked to a compatible charger having mechanical components and/or terminals similar to the battery receptacle 66 of the present hand-held mixer 10. An example of such a charger is described in the pending, commonly-owned U.S. Provisional Patent Application Nos. 63/315,355, filed Mar. 1, 2022, and 63/407,933, filed Sep. 19, 2022.

The battery 74 and corresponding electronic circuitry for controlling the operation of the hand-held mixer 10, including the operation of the motor 28, can be configured according to an architecture using a voltage in the range of about 10-20 volts, and in one implementation 20 volts, with it being understood that the actual voltage supplied and utilized may vary within a range around the described desired operating voltage according to factors generally understood in the art. In this manner, the battery 74 can be a five-cell 20-volt battery, although other configurations are possible. In general, such a voltage may be sufficient for operation of the hand-held mixer 10 including operation of the motor 28, which is generally understood to be a direct-current (DC) motor, and in one aspect a brushless DC motor, at an acceptable torque for typically-accepted use as a hand-held mixer within an acceptable operating speed.

In various embodiments, the first and/or second pillars 54, 60 extending between the housing 12, in which the motor 28 is disposed, and the battery receptacle 66, to which the battery pack 72 is configured to be docked, may result in the hand-held mixer 10 having an ergonomic center of mass that allows for convenient handling of the hand-held mixer 10 during use. The gearbox 34 being configured, such that the drive shaft axis of rotation 32 is substantially parallel to the first and second beater axes of rotation 40, 42, allows the motor 28 and gearbox 34 to be disposed within the housing 12, which results in the housing 12 end of the hand-held mixer 10 being relatively heavy. The weight of the housing 12 end of the hand-held mixer 10 is balanced by the weight of the battery pack 72, which is distal from the housing 12. In operation of the hand-held mixer 10, the drive shaft axis of rotation 32 and first and second beater axes of rotation 40, 42 often extend substantially vertically and the front side 14 of the housing 12 faces substantially vertically-downward, as the first and second beaters 24, 26 protrude downward into a mixing vessel. As such, the first and second pillars 54, 60 extend generally horizontally from the housing 12 to the battery pack 72 that is distal from the housing 12. Accordingly, for a user gripping the first pillar 54 of the hand-held mixer 10 in this orientation, the weight of the battery pack 72 can aid in balancing out the weight of the housing 12 and the components disposed therein.

Figure 11:
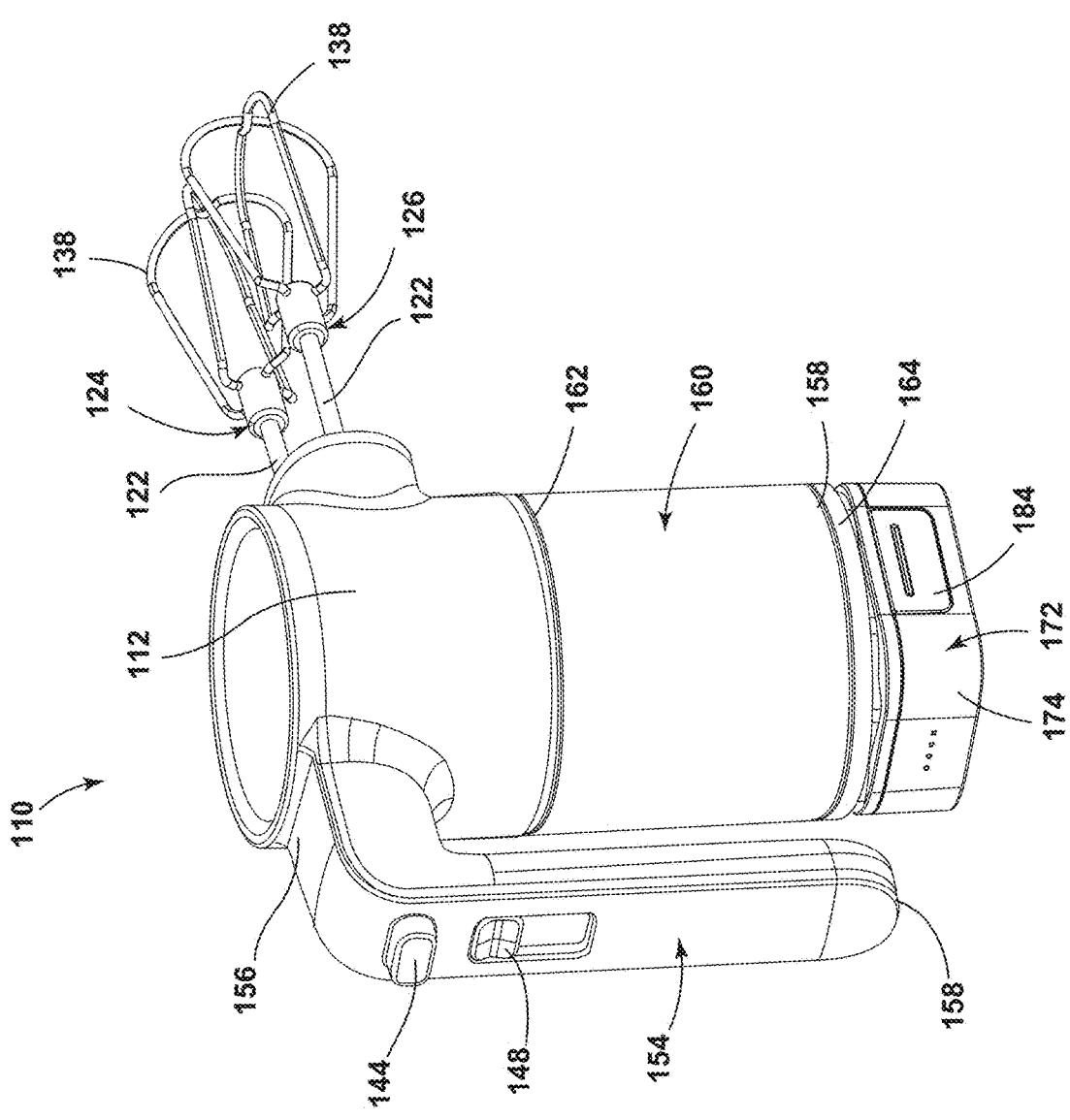
FIG. 11 is a top perspective view of an embodiment of a hand-held mixer.
Figure 12:
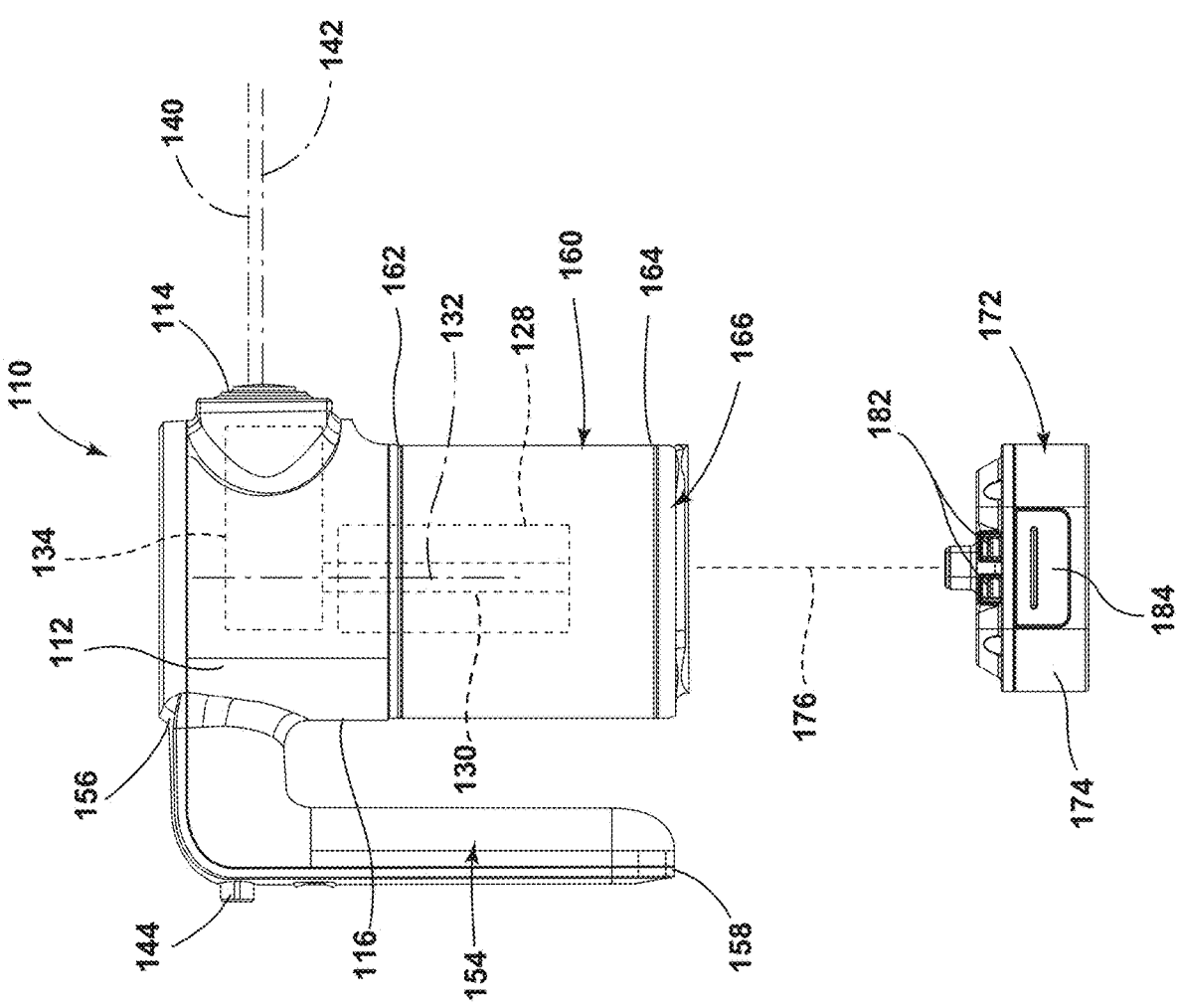
FIG. 12 is a side elevational view of a hand-held mixer illustrating a battery pack in an undocked condition.
Figure 13:
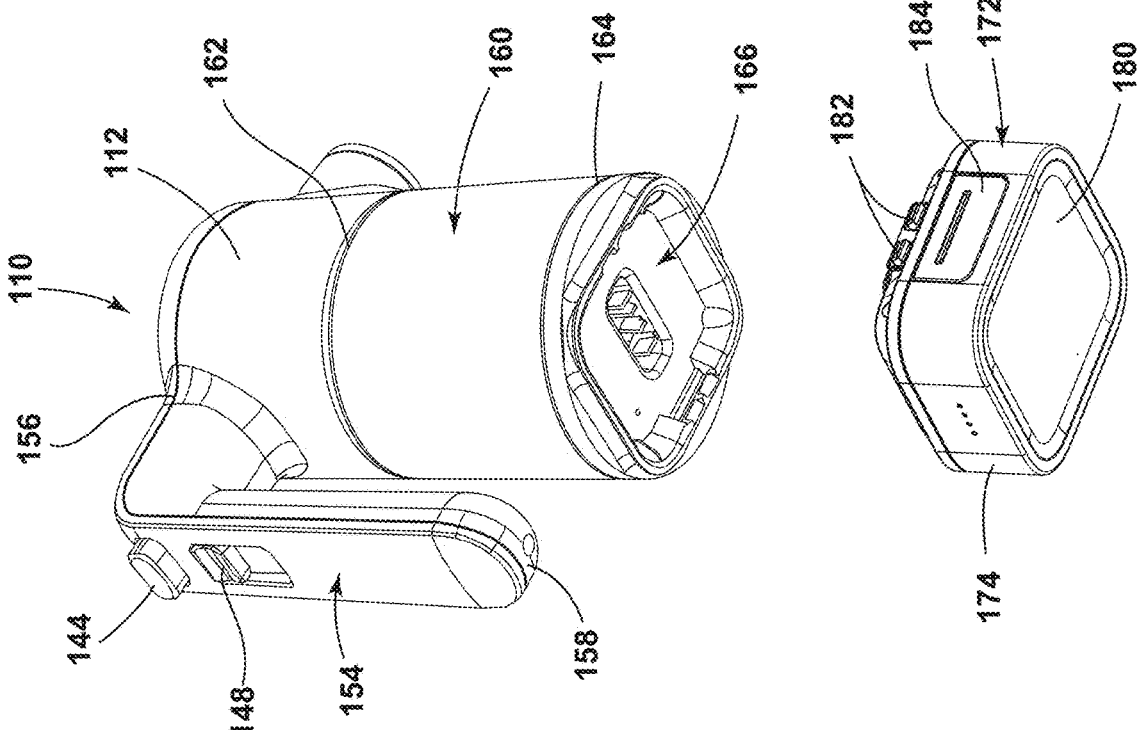
FIG. 13 is a bottom perspective view of a hand-held mixer, illustrating a battery receptacle and a battery pack in an undocked condition.

Referring now to FIGS. 11-13, another example of a hand-held mixer 110 is illustrated. In reference to the example of the hand-held mixer 110 illustrated in FIGS. 11-13, the numbering of elements of the hand-held mixer 110 are increased by 100 relative to the numbering of similar elements of the example hand-held mixer 10 provided in FIGS. 1-10. The illustrated example of the hand-held mixer 110 includes the housing 112, the first pillar 154 that is coupled to the housing 112 at the first pillar proximal end 156, and the second pillar 160 that is coupled to the housing 112 at the second pillar proximal end 162. The second pillar 160 is larger than the first pillar 154, and can cooperate with the housing 112 to house the motor 128 and/or the gearbox 134. In the illustrated example, the gearbox 134 may be engaged with the drive shaft 130 of the motor 128, such that the gearbox 134 converts rotation of the drive shaft 130 about the drive shaft axis of rotation 132 to rotational movement about another axis that is substantially perpendicular to the drive shaft axis of rotation 132, as described further herein.

As illustrated in FIG. 11, the hand-held mixer 110 includes the first and second beaters 124, 126. The first and second beaters 124, 126 are configured to be engaged with the motor 128 via the gearbox 134, such that rotation of the drive shaft 130 about the drive shaft axis of rotation 132 causes the first beater 124 to rotate about the first beater axis of rotation 140 and the second beater 126 to rotate about the second beater axis of rotation 142. As illustrated in FIG. 12, the first and second beater axes of rotation 140, 142 are substantially perpendicular to the drive shaft axis of rotation 132. As illustrated in FIG. 11, the first and second beaters 124, 126 can include shafts 122 and beater heads 138, respectively.

Referring still to FIGS. 11-13, the first pillar 154 extends outward from the first pillar proximal end 156 to the first pillar distal end 158 that is distal from the housing 112. Further, the second pillar 160 extends outward from the housing 112 to the second pillar distal end 164. The second pillar 160 is nearer than the first pillar 154 to the front side 114 of the housing 112. As illustrated in FIG. 12, the front side 114 of the housing 112 is opposite the rear side 116 of the housing 112. In the illustrated example, the first and second pillar distal ends 158, 164 are spaced apart from each other, such that the first pillar 154 is configured to serve as an operating handle for the hand-held mixer 110. As further shown in FIGS. 11-13, the first pillar 154 is configured to extend generally flush, or continuously, with a corresponding outer surface of the housing 112 to define a generally uniform appearance between the housing 112 and the first pillar 154. In the illustrated example, the housing 112 and the first pillar 154 are generally defined by two distinct structures that are assembled together with the motor 128 and gearbox 134 therein. It is contemplated, however, that the housing 112 and the first pillar 154 may be generally defined by respective portions of a single structure, with the internal components of the hand-held mixer 110 being assembled within such structure by an alternative configuration thereof. As further illustrated in FIG. 13, the first pillar 154 can include the ejector button 144 and the control feature 148.

Referring still to FIGS. 11-13, the hand-held mixer 110 includes the battery receptacle 166. As illustrated in FIG. 12, the battery receptacle 166 is coupled to the second pillar distal end 164 and is in a spaced-relationship with the first pillar distal end 158. It is contemplated that the battery receptacle 66 may extend between the first pillar distal end 58 and the second pillar distal end 64, as illustrated in FIGS. 1-6 and 10, in some implementations. The battery receptacle 66 is configured to receive the battery pack 72 for powering the motor 28 of the hand-held mixer 10.

As illustrated in FIGS. 11 and 12, the battery pack 172 is operable between the docked condition, as illustrated in FIG. 11, and the undocked condition, as illustrated in FIG. 12. In the docked condition of the battery pack 172, the battery pack 172 is engaged with the battery receptacle 166 to provide power to the motor 128 of the hand-held mixer 110. In the undocked condition, the battery pack 172 is disengaged from the battery receptacle 166, as illustrated in FIGS. 12 and 13.

As further illustrated in FIG. 12, the battery pack 172 is operable to move from the undocked condition to the docked condition along the battery pack axis 176. In some implementations, the battery pack axis 176 may be substantially parallel to the drive shaft axis of rotation 132. In some implementations, the battery pack axis 176 may be substantially perpendicular to the first beater axis of rotation 140, and/or the second beater axis of rotation 142. In the example illustrated in FIGS. 11-13, the battery pack 172 is configured to move between the docked and undocked conditions in a direction that is substantially parallel to the drive shaft axis of rotation 132 and substantially perpendicular to the first beater axis of rotation 140 and the second beater axis of rotation 142. In various implementations, the battery receptacle 166 may guide the direction of movement of the battery pack 172 along the battery pack axis 176.

In various embodiments, the battery pack 172 is the farthest portion of the hand-held mixer 110 from the housing 112 in the docked condition of the battery pack 172. Further, the battery pack 172 includes a bottom surface 180 that is configured to rest upon a level surface, such as a counter, such that the hand-held mixer 110 sits upright (i.e., in the upright position) with the first and second beater axes of rotation 140, 142 extending substantially horizontally, as illustrated in FIG. 12. The first and second beater axes of rotation 140, 142 may be substantially vertical in a use position of the hand-held mixer 110. For example, from the perspective of a viewer of FIG. 12, rotating the hand-held mixer 110 of FIG. 12 clockwise 90 degrees such that the first and second beater axes of rotation 140, 142 extend substantially vertically would depict the hand-held mixer 110 in the use position.

The battery 174 and corresponding electronic circuitry for controlling operation of the example of the hand-held mixer 110 illustrated in FIGS. 11-13, including the operation of the motor 128, can be configured according to an architecture using a voltage of about 12 volts, with it being understood that the actual voltage supplied and utilized may vary within a range around the described desired operating voltage according to factors generally understood in the art. Accordingly, a "12-volt" battery as used herein refers to a general classification of battery that would be understood by a person of ordinary skill in the art to have an output that may not be exactly 12 volts due to, for example, fluctuations in power delivery during use or as an effect of the charge condition of cells within the battery. In this respect, the battery 174 of the example of the hand-held mixer 110 illustrated in FIGS. 11-13 may be smaller in output relative to the 18-20 volt battery 74 described above herein in reference to FIGS. 1-6 and 10. The smaller output battery 174 provides a lower current to the motor 128. As such, the 12-volt battery 174 can be smaller in size while still providing the desired duration of power supply and corresponding use of the hand-held mixer 110. The battery receptacle 166 configured to receive the 12-volt battery 174 illustrated in FIGS. 11-13 can, accordingly, be smaller than the battery receptacle 66 configured to receive the 20-volt battery 74 in FIGS. 1-6 and 10.

As illustrated in FIGS. 11-13, the battery pack 172 is adapted for a snap-fit arrangement with the battery receptacle 166, wherein the battery pack 172 is moved toward the battery receptacle 166 in a direction substantially perpendicular to the first and second beater axes of rotation 140, 142 and pressed into the docked condition. In this arrangement, terminals of the battery receptacle 166 engage with aligned terminals of the battery pack 172 for electrical connection between the battery 174 and electrical components of the hand-held mixer 110. As illustrated in FIGS. 11-13, the battery pack 172 can include spring-loaded tabs 182. The spring-loaded tabs 182 are biased outwardly but are moved inwardly by initial engagement with corresponding notches in the battery receptacle 166, as the battery pack 172 is moved toward the docked condition. Subsequently, the tabs 182 resiliently rebound outward when they have passed beyond the notches to fix the battery pack 172 in the docked condition. When the battery pack 172 is to be removed, buttons 184 associated with the tabs 182 can be depressed to move the tabs 182 inward, thereby releasing them from the notches.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and/or the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A hand-held mixer, comprising:
a housing having a front side and a rear side opposite the front side;
a pillar that is coupled to the housing at a pillar proximal end and extends outward therefrom to a pillar distal end;
a second pillar that is coupled to the housing at a second pillar proximal end and extends outward therefrom to a second pillar distal end;
a motor that is positioned within at least one of the housing and the pillar;

a first beater hub removably receiving a first beater having a beater head and a shaft coupled to the beater head, the first beater hub being operably engaged with the motor such that, in an engaged condition of the first beater, operation of the motor drives rotation of the first beater about a first beater axis of rotation; and
a battery receptacle extending between the pillar distal end and the second pillar distal end to form a loop defining a handle aperture, the battery receptacle being and configured to receive a battery pack having a battery for powering the motor such that the battery pack is operable between a docked condition, wherein the battery pack is engaged with the battery receptacle to provide power to the motor, and an undocked condition, wherein the battery pack is disengaged from the battery receptacle, and wherein the battery pack moves along a battery pack axis that is substantially parallel to the first beater axis of rotation from the undocked condition to the docked condition.

2. The hand-held mixer of claim 1, wherein the first beater is operable between an engaged condition, wherein the shaft is partially inserted into a first aperture defined by the first beater hub and exposed on the front side of the housing so as to be operably engaged with the motor, and a disengaged condition, wherein the shaft is removed from the first aperture so as to be operably disengaged from the motor.

3. The hand-held mixer of claim 1, further comprising:
a second beater hub removably receiving a second beater having a beater head and a shaft coupled to the beater head, the second beater hub being operably engaged with the motor such that, in an engaged condition of the second beater, operation of the motor drives rotation of the second beater about a second beater axis of rotation.

4. The hand-held mixer of claim 1, further comprising:
a gearbox having a plurality of gears disposed within at least one of the housing and the pillar and being operably coupled to the motor, wherein the first beater hub is operably engaged with the motor via the gearbox.

5. The hand-held mixer of claim 4, wherein the motor includes a drive shaft that is operably coupled with the gearbox and configured to rotate about a drive shaft axis of rotation, and wherein the drive shaft axis of rotation is substantially perpendicular to the first beater axis of rotation.

6. The hand-held mixer of claim 5, wherein the drive shaft axis of rotation is substantially parallel to the battery pack axis.

7. The hand-held mixer of claim 1, wherein the battery pack includes a bottom surface that is configured to rest upon a level surface to maintain said hand-held mixer in an upright position, wherein the first beater axis of rotation extends substantially horizontally.

8. The hand-held mixer of claim 7, wherein the motor includes a drive shaft configured to rotate about a drive shaft axis of rotation, and wherein the drive shaft axis of rotation is substantially vertical in the upright position of said hand-held mixer.

9. The hand-held mixer of claim 1, wherein the battery pack is the farthest portion of said hand-held mixer from the housing in the docked condition of the battery pack.

10. The hand-held mixer of claim 1, wherein the battery receptacle includes at least one notch that engages with at least one spring-loaded tab of the battery pack, wherein the at least one spring-loaded tab is biased outwardly and configured to be moved inwardly by initial engagement with the at least one notch in the battery receptacle as the battery pack is moved toward the docked condition.

11. The hand-held mixer of claim 10, wherein the at least one tab is configured to resiliently rebound outward to fix the battery pack in the docked condition.

12. The hand-held mixer of claim 1, wherein the pillar at least partially houses the motor.

13. The hand-held mixer of claim 1, wherein the battery is a 12-volt battery.

14. A hand-held mixer, comprising:

a housing having a front side and a rear side opposite the front side;

a first pillar that is coupled to the housing at a first pillar proximal end and extends outward therefrom to a first pillar distal end;

a second pillar that is coupled to the housing at a second pillar proximal end and extends outward therefrom to a second pillar distal end;

a motor that is positioned within at least one of the housing and the second pillar;

a first beater having a beater head and a shaft coupled to the beater head, the first beater being operably engaged with the motor in a removably engaged condition of the first beater with the housing, such that operation of the motor is configured to drive rotation of the first beater about a first beater axis of rotation;

a battery receptacle extending between the first pillar distal end and the second pillar distal end to form a loop defining a handle aperture; and a battery pack having a battery for powering the motor, the battery pack being operable between a docked condition, wherein the battery pack is engaged with the battery receptacle to provide power to the motor, and an undocked condition, wherein the battery pack is disengaged from the battery receptacle, and wherein the battery pack moves along a battery pack axis that is substantially parallel to the first beater axis of rotation from the undocked condition to the docked condition.

15. The hand-held mixer of claim 14, wherein the motor includes a drive shaft that is operable to rotate about a drive shaft axis of rotation, and wherein the drive shaft axis of rotation is substantially perpendicular to the first beater axis of rotation.

16. The hand-held mixer of claim 15, wherein the drive shaft axis of rotation is substantially parallel to the battery pack axis.

17. The hand-held mixer of claim 14, wherein the battery pack includes a bottom surface that is configured to rest upon a level surface to maintain said hand-held mixer in an upright position, wherein the first beater axis of rotation extends substantially horizontally.

18. The hand-held mixer of claim 17, wherein the motor includes a drive shaft configured to rotate about a drive shaft axis of rotation, and wherein the drive shaft axis of rotation is substantially vertical in the upright position of said hand-held mixer.

19. The hand-held mixer of claim 14, wherein the second pillar at least partially houses the motor.

20. A hand-held mixer, comprising:

a housing having a front side and a rear side opposite the front side;

a first pillar that is coupled to the housing at a first pillar proximal end and extends outward therefrom to a first pillar distal end;

a second pillar that is coupled to the housing at a second pillar proximal end and extends outward therefrom to a second pillar distal end, wherein the second pillar is nearer than the first pillar to the front side of the housing;

a motor that is positioned within at least one of the housing and the second pillar, the motor being configured to drive rotation of a drive shaft about a drive shaft axis of rotation;

a gearbox having a plurality of gears disposed within at least one of the housing and the second pillar and being operably coupled to the motor;

a first beater having a beater head and a shaft coupled to the beater head, the first beater being operable between an engaged condition, wherein the shaft of the first beater is partially inserted into a first aperture defined by the front side of the housing and operably engaged with the motor via the gearbox, such that rotation of the drive shaft about the drive shaft axis of rotation causes the first beater to rotate about a first beater axis of rotation that is substantially perpendicular to the drive shaft axis of rotation, and a disengaged condition, wherein the shaft of the first beater is not operably engaged with the motor via the gearbox and is removable from the first aperture defined by the housing;

a battery receptacle coupled to the second pillar distal end; and a battery pack configured for 12-volt operation to power the motor and being operable between a docked condition, wherein the battery pack is engaged with the battery receptacle to provide power to the motor, and an undocked condition, wherein the battery pack is disengaged from the battery receptacle, and wherein the battery pack moves along a battery pack axis that is substantially parallel to the drive shaft axis of rotation from the undocked condition to the docked condition wherein the battery pack includes a bottom surface that is configured to rest upon a level surface to maintain said hand-held mixer in an upright position, wherein the first beater axis of rotation extends substantially horizontally in the upright position.

* * * * *